March 25, 1924.
F. C. TRIMBACH
CASTER
Filed May 23, 1922
1,487,902
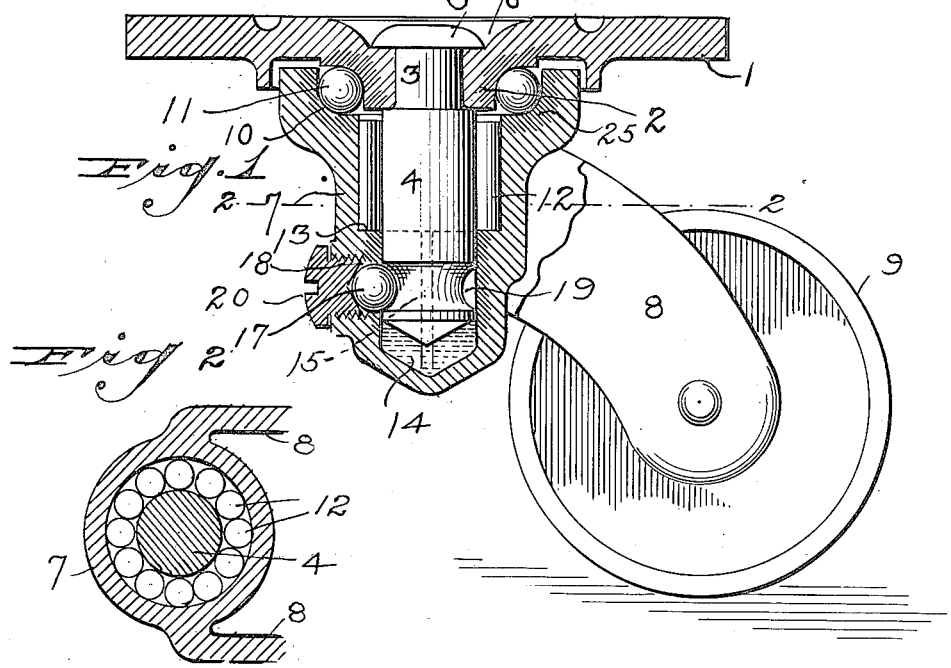
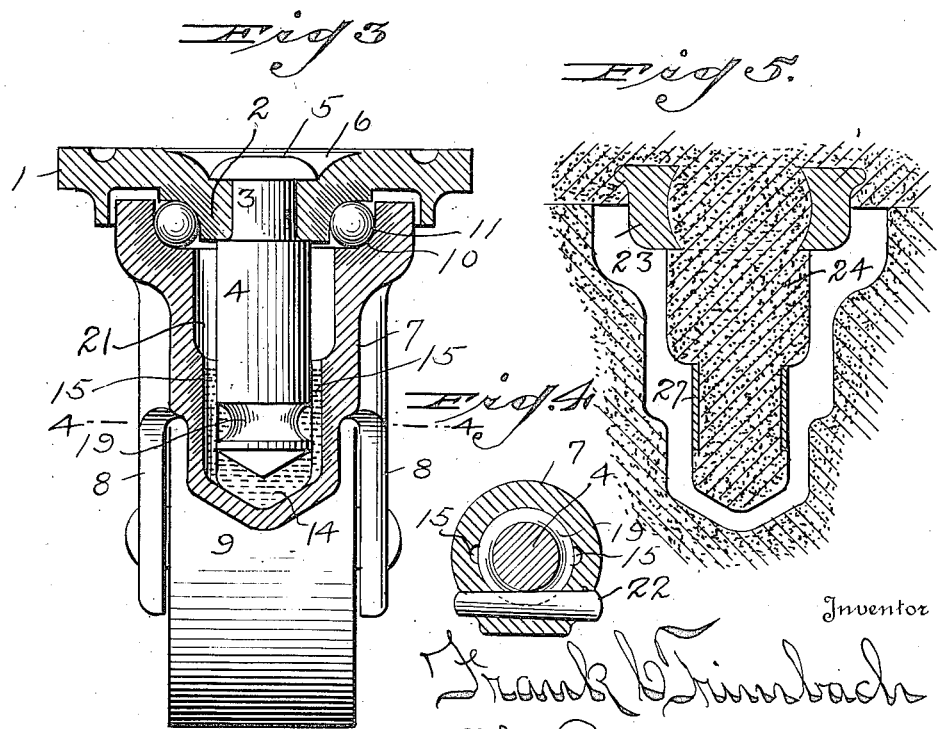
Inventor
Frank Trimbach
By T. L. Walker Attorney Patented Mar. 25, 1924.

1,487,902

UNITED STATES PATENT OFFICE.

FRANK C. TRIMBACH, OF DAYTON, OHIO.

CASTER.

Application filed May 23, 1922. Serial No. 563,052.

*To all whom it may concern:*

Be it known that I, FRANK C. TRIMBACH, a citizen of the United States, residing at Dayton, in the county of Montgomery and State of Ohio, have invented certain new and useful Improvements in Casters, of which the following is a specification.

My invention relates to casters or swivel rollers and is more particularly applicable to casters of the trailing type for warehouse trucks, storage bins and similar purposes, but may be also applied to casters of smaller type such as are used upon articles of furniture, desks, chairs, etc., for office and household use. Moreover, while the invention is shown and described in conjunction with a caster of the trailing type, various features of invention are equally applicable to casters of other types.

The object of the invention is to simplify the structure as well as the means and mode of manufacture of such casters, whereby they will not only be cheapened in construction, but will be more efficient in use, of maximum durability, freely and easily revoluble, capable of being easily and quickly assembled and disassembled, and unlikely to get out of repair.

A further object of the invention is to provide a caster having improved ball and roller bearings, and to afford an improved mode of manufacturing casters, whereby necessity for separate ball races and cones is eliminated.

A further and important object of the invention is to provide in a caster of such type, a lubricant reservoir and pocket for sediment in which may collect dust, grit and foreign material, which would otherwise tend to wear the bearings.

A further object of the invention is to provide an improved form of frictionless key or engaging means between the trunnion stud and the trailer carriage.

With the above primary and other incidental objects in view as will more fully appear in the specification, the invention consists of the features of construction, the parts and combinations thereof, and the mode of operation, or their equivalents as hereinafter described and set forth in the claims.

In the accompanying drawings, wherein are shown the preferred, but obviously not necessarily the only form of embodiment of the invention, Fig. 1 is a vertical sectional view of an assembled caster embodying the invention, and containing both ball and roller bearings. Fig. 2 is a detail sectional plan view on line 2—2 of Fig. 1. Fig. 3 is a vertical sectional view of a modification of the construction shown in Fig. 1. Fig. 4 is a transverse sectional view on line 4—4 of Fig. 3. Fig. 5 is a sectional view of the sand mold for casting the socket portion of the trailer carriage, illustrating the mode of positioning and relative location of the chills, for producing hardened bearing surfaces.

Like parts are indicated by similar characters of reference throughout the several views.

Referring to the drawings, 1 is the head plate preferably made from cast iron. This head plate is adapted to be attached to the bottom of the truck or other supported structure, by means of screws, bolts or other fastening means. Centrally disposed on the bottom face of the head plate 1 is a dependent boss 2, having therethrough an opening for the neck 3 of a dependent trunnion stud 4. This trunnion stud 4 is preferably made independent of the head plate 1, and from steel or other suitable material not subject to breakage when subjected to strain. The neck 3 of the stud is upset or riveted as at 5, within a central depression 6 in the top of the head plate 1.

Pivotally mounted upon the dependent trunnion stud 4 is the trailer carriage, comprising the head or socket portion 7, from which extends downwardly and rearwardly parallel arms 8, between which is pivoted, the carrying wheel or roller 9. The head or socket portion 7 of the carriage is formed with a double counter-bore to receive the trunnion stud 4. Adjacent to the top of the head or socket 7 there is formed by such counter-bore a shoulder or offset 10, which forms the ball race for a series of bearing balls 11, for which the dependent boss 2 of the head plate 1, forms the bearing cone. This ball bearing comprising the balls 11 interposed between the ball race 10 and the head plate boss or cone 2 takes the vertical thrust or weight of the supported structure and also some of the lateral or shifting pressure. The latter, however, is sustained primarily by the trunnion studs 4, which projecting within the socket or head portion 7 of the carriage engages with a series of bearing rollers 12, surrounding the trunnion stud 4, and located in an intermediate counterbore of the socket. Below the shoulder or offset 13, which defines the roller recess, the trunnion stud 4, has bearing upon the side walls of the socket. The trunnion stud 4 terminates in spaced relation with the bottom of the socket or bore within the head of the trailer carriage, affording beneath the trunnion a reservoir or pocket 14, for lubricant, and which will also serve as a collection pocket for sediment, grit and foreign material which may find its way through the bearings of the caster. To afford proper distribution of the lubricant and also facilitate the settling of grit and foreign material to the bottom of the socket bore, longitudinally disposed channels 15 are provided on opposite sides of the bore, extending from the bottom of the socket to the shoulder 13.

To prevent the disengagement of the trailer carriage from the trunnion stud, yet reduce frictional resistance to rotation, to a minimum, there is provided a special form of key or detachable engaging device. This comprises a bearing ball 17, located within a lateral bore or hole 18 formed in the side of the socket or head portion 7, in registry with a peripheral groove 19 formed in the trunnion stud 4, within which the ball 17 also engages. The ball is of such size and so located that it projects partially within the peripheral grove 19, and partially within the hole or recess 18. It is held in this position of engagement within the peripheral groove 19, by means of an unyielding abutment or plug 20, threaded into the opening 18. This plug 20 not only serves to hold the ball in place, but also affords access to the lubricant and sediment pocket to facilitate cleaning.

Inasmuch as the tendency or leverage of the device is such that when subjected to weight the trunnion stud will bear heaviest upon the forward side of its socket in the carrying head, the retaining or key ball 17 is also located at the forward side, and serves to reduce friction by rotating as the stud and carriage are relatively rotated. By releasing the screw plug 20, the ball may be disengaged from the peripheral groove 19, and the stud 4 withdrawn from the carriage head.

In Fig. 3 there is shown a modification, wherein the intermediate carrying rollers 12 have been omitted. The recess 21 which otherwise would contain the rollers 12 is retained in the construction shown in Fig. 3 to reduce friction. In addition to the bearing balls 11 at the top of the carriage head, the stud 4 has bearing in the lower portion of the socket, though terminating in spaced relation with the bottom thereof. By locating the lubricant distributing channels and sediment collecting passages at the side of the trunnion studs or laterally disposed in relation with the direction of movement of the trailing carriage, they are in a position least subjected to the pressure of the stud and full bearing surface is maintained at the point where it is most needed. By locating the retaining or key ball 17 on the forward side of the socket and trunnion substantially in the line of travel of the trailing carriage, this ball will relieve the frictional engagement of the stud within its socket by a rolling or revoluble movement.

As an alternative form of retaining device, there is shown in Fig. 4 a tapered pin 22, located transversely in the socket portion or head of the trailing carriage where it intersects the bore or socket and projects within the peripheral groove 19, of the stud 4. While the retaining ball construction shown in Fig. 1 is to be preferred, the construction in Fig. 4 will be found quite efficient and for certain classes of service and conditions of use may be quite desirable.

A very important feature in the caster industry is the economy of manufacture. The art is well developed and competition is quite keen. In view of this any feature or operation which lends itself to economy of manufacture is almost as equally important as structural improvements. The present caster is designed with view to reducing manufacturing costs by eliminating the necessity of independently constructed ball races and bearing cones, and with view to affording a finished product without machine operation. To this end there is shown in Fig. 5 a mode of casting the trailer carriage wherein an annular chill 23 of metal is inserted within the sand core 24 for the purpose of not only producing a hardened surface for the ball race 10 as shown at 25, but also producing a smooth surface for such ball race without the necessity of machine operation. By employing the chill, in the core, the necessity for a separate ball race cup is entirely avoided and the race 10 is made sufficiently smooth and sufficiently hard to withstand the ordinary amount of wear with minimum cost of manufacture. In order to secure a perfectly smooth round socket bearing for the stud 4, a ring 27 of sheet metal is embedded in the sand core 24 in spaced relation with the aforementioned chill. This ring 27 is preferably of tin, though it may be of other material. The ring will serve to some extent as a chill but will be melted and absorbed into the metal of the caster head or socket member, thereby insuring a dense and smooth interior bearing surface for the lower end of the stud 4.

Having thus described my invention, I claim:

1. In a supporting caster, a dependent trunnion stud, means for attaching the stud to the supported structure, a thrust bearing below which the stud extends in pendant relation a socket member within which the trunnion stud projects and in spaced relation with the bottom of which the stud terminates, the stud receiving recess in said socket member being extended downwardly beyond the extremity of the trunnion stud to form below the end of the stud a lubricant reservoir and sediment collecting chamber.

2. In a supporting caster a dependent trunnion stud for attachment to the supported structure, a thrust bearing below which the stud extends in pendant relation a carriage having therein a socket for the reception of the dependent trunnion stud, said stud being terminated in spaced relation with the bottom of the socket affording a sediment collecting pocket beneath the trunnion stud.

3. In a caster of the trailing type, a dependent trunnion stud, means for attaching the stud to a supported structure, a carriage having a socket therein to receive the trunnion stud, said socket being of greater depth than the extent of the stud thereinto, whereby a reservoir is afforded in the bottom of the socket beneath the stud, and channels extending upwardly from said reservoir on the lateral sides of the socket in relation with the direction of the trailing movement of the carriage.

4. In a caster of the trailing type, a dependent trunnion stud, a carriage pivoted to said stud, a lubricant reservoir in said carriage and a channel in the stud bearing in said carriage communicating with the reservoir and laterally disposed in said bearing in relation with the direction of trailing movement of the carriage.

5. In a caster, a dependent trunnion stud, means for attaching the stud to a supported structure, a carriage pivoted upon said stud, said stud having therein a peripheral channel, said carriage having therein a radial bore registering with said peripheral channel and a ball seated partly in said radial bore and partly in said peripheral groove but confined to a single radial position to prevent withdrawal of the stud from its bearing in said carriage.

6. In a caster, a dependent trunnion stud, means for attaching the stud to a supported structure, a carriage pivoted to said stud, and a rotatable key member simultaneously engaging in seats formed in the stud and in the carriage for locking the stud against withdrawal from the carriage, said key member being rotatable with the relative rotation of the stud and carriage to minimize friction, the rotation of the key member being limited to its own center in a single radial plane.

7. In a caster, a trunnion stud, means for attaching the stud to a supported structure, a carriage pivoted upon the stud, said stud having a peripheral groove therein, said carriage having a bore therein, transverse to the axis of the stud and registering with said peripheral groove, a bearing ball inserted and retained within the lateral sides of said bore and projecting thence into said groove, and a non-yielding abutment for the ball preventing its disengagement from the groove.

8. In a caster, a trunnion stud, a head plate for attaching the stud to a supported structure, a carriage pivoted upon said stud, said carriage having a stepped bearing to receive the stud bearing balls located within the outer stepped section of the bore interposed between the carriage and head plate, and a series of bearing rollers located in an inner stepped section of the bore and interposed between the stud and the carriage.

9. In a caster, a trunnion stud, a cast metal socket member for the stud and a sheet metal lining for the socket receiving recess fused within the socket member during the casting operation to afford a smooth hardened bearing surface for the stud without the necessity of machining operations.

10. In a caster, a trunnion stud, a cast metal socket member for the stud a receiving bore of which is formed with an enlarged mouth and a chill hardened annular internal shoulder formed about the mouth of the stud receiving recess of the socket member by such enlargement thereof, providing a ball race and a thrust ball bearing on said race sustaining the weight of the caster load entirely independent of the stud, below which the stud projects in pendant relation.

11. In a caster, a trunnion stud, a cast metal socket member for the stud, the stud receiving bore of the socket member having an enlarged mouth, a chill hardened smooth annular shoulder, formed by the enlargement of the mouth of the socket member and a sleeve of thin sheet metal integrally united with the walls of the receiving bore in the socket member to afford a smooth hardened bearing surface without the necessity of machining operations.

12. In a caster, a trunnion stud, a cast metal socket member for the reception of said trunnion stud, said stud socket the receiving recess of said socket being formed with a counter-bore affording a chill hardened internal shoulder therein, to afford a hardened smooth ball race without the necessity of machining operations, a series of bearing balls engaging such chill hardened ball race, a head plate carried by the stud and a bearing cone upon the head plate engaging the bearing balls.

13. In a caster, a top plate adapted to support a load, a dependent trunnion stud carried thereby, a carriage including a socket portion having a bore to receive said trunnion stud, the trunnion receiving bore having an enlarged mouth, forming an internal shoulder, and a series of bearing balls located on said shoulder and supporting the top plate independent of said stud which projects within the socket in pendant relation below said shoulder and bearing balls.

14. In a caster, a top plate adapted to support a load, a dependent trunnion stud carried thereby, a carriage including a socket portion having a stepped bore to receive said stud, and two independent series of anti-friction bearing members located in the different stepped sections of the stud receiving bore.

In testimony whereof, I have hereunto set my hand this 18th day of May A. D. 1922.

FRANK C. TRIMBACH.

Witnesses:
GEORGE C. HELWIG,
WILLIAM A. SWANEY.